(12) United States Patent
Huang (10) Patent No.: US 6,644,157 B2
(45) Date of Patent: Nov. 11, 2003

(54) TABLE SAW HAVING ADJUSTABLE WORKTABLE

(75) Inventor: Peter Huang, Taichung (TW)

(73) Assignee: Durq Machinery Corp., Taichung (TW)

( * ) Notice: Subject to any disclaimer, the term of this patent is extended or adjusted under 35 U.S.C. 154(b) by 176 days.

(21) Appl. No.: 09/973,923

(22) Filed: Oct. 11, 2001

(65) Prior Publication Data

US 2003/0070522 A1 Apr. 17, 2003

(51) Int. Cl.[7] ............................................... B23D 33/02
(52) U.S. Cl. .............................. 83/438; 83/474; 144/287
(58) Field of Search .................... 83/438, 474; 144/287, 144/286.5, 286.1; 108/69; 248/569, 644, 670, 674, 678, 122.1, 200.1

(56) References Cited

U.S. PATENT DOCUMENTS

| | | | |
|---|---|---|---|
| D244,194 S | * 5/1977 | Roch | D15/123 |
| 4,111,409 A | * 9/1978 | Smith | 269/304 |
| 4,964,450 A | * 10/1990 | Hughes et al. | 144/287 |
| 5,526,856 A | * 6/1996 | Pedri | 144/287 |
| 5,730,434 A | * 3/1998 | Schoene et al. | 269/88 |
| 5,868,054 A | * 2/1999 | Chubb et al. | 83/522.18 |
| 5,988,243 A | * 11/1999 | Ayala et al. | 144/329 |
| 6,161,459 A | * 12/2000 | Ceroll et al. | 83/468 |
| 6,240,822 B1 | * 6/2001 | Musser | 83/446 |
| 6,508,281 B1 | * 1/2003 | Wang | 144/287 |

FOREIGN PATENT DOCUMENTS

| | | | | |
|---|---|---|---|---|
| DE | 4112816 A1 | * 11/1991 | | B25H/1/06 |
| FR | 431822 | * 9/1911 | | 144/287 |
| GB | 1208363 | * 10/1970 | | B25H/1/04 |
| GB | 0096470 A2 | * 12/1983 | | B25H/1/10 |
| GB | 2271527 A | * 4/1994 | | B23D/49/00 |
| SU | WO 91/14543 | * 10/1991 | | B25H/1/02 |

* cited by examiner

Primary Examiner—Allan N. Shoap
Assistant Examiner—John Windmuller
(74) Attorney, Agent, or Firm—Browdy and Neimark, P.L.L.C.

(57) ABSTRACT

A table saw comprises a circular saw blade suspended in an elongated slot of a worktable and adapted to cut a workpiece, a rib fence adapted to stop the workpiece on the worktable for cutting, a transverse bar fastened to two parallel sliding rods and moved with the sliding rods relative to the worktable to adjust the pitch between the circular saw blade and the rib fence, a connecting member adapted to connect the rib fence to the transverse bar for enabling the rib fence to be moved with the transverse bar on the worktable in direction perpendicular to the slot, the rib fence being connectable to the transverse rib fence and movable on the transverse bar in direction parallel to the slot after disconnection of the connecting member from the rib fence and the transverse bar.

5 Claims, 8 Drawing Sheets

TABLE SAW HAVING ADJUSTABLE WORKTABLE

FIELD OF THE INVENTION

The present invention relates generally to a table saw, and more particularly to the table saw which has an improved worktable.

BACKGROUND OF THE INVENTION

When using a table saw, the workpiece is put on the worktable and stopped at one side of a rib fence, and then the user pushes the workpiece forwards on the worktable along the rib fence against the rotating circular saw blade, causing the workpiece to be cut by the rotating circular saw blade. When cutting a wooden board or an elongated workpiece greater than the length of the rib fence or the area of the worktable, the workpiece cutting procedure cannot be finished through one step, and a vibration tends to occur during cutting, resulting in an uneven cut surface of the workpiece after cutting.

SUMMARY OF THE INVENTION

It is therefore the primary objective of the present invention to provide a table saw, which enables the user to adjust the area of the worktable and the position of the rib fence to fit workpieces of different dimensions and shapes so that workpieces can accurately be cut.

In keeping with the principle of the present invention, the foregoing objective of the present invention is attained by a table saw which is comprised of a base; a worktable fixedly supported on the base, the worktable having an elongated saw-blade slot; a circular saw blade pivoted in the base and partially projecting out of the saw-blade slot; a motor mounted inside the base and adapted to rotate the circular saw blade; two sliding rods arranged in parallel at a bottom side of the worktable and moved in and out of one side of the worktable in direction perpendicular to the elongated saw-blade slot; a transverse bar fixedly fastened to the sliding rods at one end and disposed in parallel to the elongated saw-blade slot, the transverse bar comprising a coupling portion; a rib fence adapted to stop one side of the workpiece to be cut being put on the worktable for cutting, the rib fence having a length equal to the transverse bar, a flat bottom sidewall, a stop face disposed at one lateral side thereof and adapted to stop the workpiece to be cut in position for cutting, and a coupling portion connectable to the coupling portion of the transverse bar; and a connecting member having two opposite sides connected detachably and respectively to said rib fence and said transverse bar, whereby enabling said rib fence to be moved with said transverse bar and said sliding rods on said worktable when said connecting member is connected to said rib fence and said transverse bar, and said couple coupling portion of said rib fence being connected directly to said coupling portion of said transverse bar at the time when said connecting member is detached from said rib fence and said transverse bar.

DETAILED DESCRIPTION OF THE INVENTION

As shown in all drawings, the table saw of a preferred embodiment of the present invention is comprised of a base 10, a worktable 20, a circular saw blade 30, two sliding rods 40, a transverse bar 50, a connecting member 60, and a rib fence 70.

The base 10 has a motor (not shown) mounted on the inside.

The worktable 20 is a rectangular plate member fixedly supported on the base 10, having an elongated slot 21 transversely disposed on the middle in parallel to the two opposite short sides thereof, a substantially U-shaped saw blade guard 22 pivoted to one long side of the worktable corresponding in location to the elongated slot 21.

The circular saw blade 30 is pivoted to the base 10 and coupled to the motor in the base 10, having an upper half protruded over the top surface of the worktable 20 through the elongated slot 21. When not in use, the U-shaped saw blade guard 22 is covered on the worktable 20 over the circular saw blade 30.

The two sliding rods 40 are round rods longitudinally bilaterally provided at the bottom side of the worktable 20 in parallel to the two opposite long sides of the worktable 20, and constrained by at least one support member 23 to move back and forth smoothly along the long axis of the worktable 20. The support member 23 supports the sliding rods 40, having a bottom screw hole (not shown), and a holding down screw 24, threaded into the bottom screw hole to fix the sliding rods 40 in the desired position, preventing the sliding rods 40 from falling out of the worktable 20.

The transverse bar 50 is a substantially rectangular bar of length approximately equal to the width between the two opposite short sides of the worktable 20, having one lateral sidewall fixedly fastened to the sliding rods 40 and arranged in parallel to the elongated slot 21, and a longitudinal rib 51 of T-shaped cross section extended along the other lateral sidewall thereof. When installed, the top sidewall of the transverse bar 50 is maintained equal to the elevation of the top surface of the worktable 20.

The connecting member 60 is a flat plate member having one side (the right side in FIG. 2) detachably fastened to the top sidewall of the transverse bar 50 by two quick-release locks each formed of a screw bolt 24 and a locking lever 61. The other side of the connecting member 60 extends in direction toward the elongated slot 21 and terminating in an upwardly protruded coupling portion 62.

The rib fence 70 is a rectangular bar having one lateral side stopped at the coupling portion 62 of the connecting member 60 and detachably fastened thereto by two quick-release locks each formed of a screw bolt 24 and a locking lever 61. The other lateral side of the rib fence 70 is a stop face 71 adapted to stop the workpiece on the worktable 20. The rib fence 70 has a coupling groove 72 of T-shaped cross section extended in the middle of the stop face 71 to the two distal ends thereof and adapted to fit the longitudinal rib 51 of T-shaped cross section of the transverse bar 50.

Figure 1:
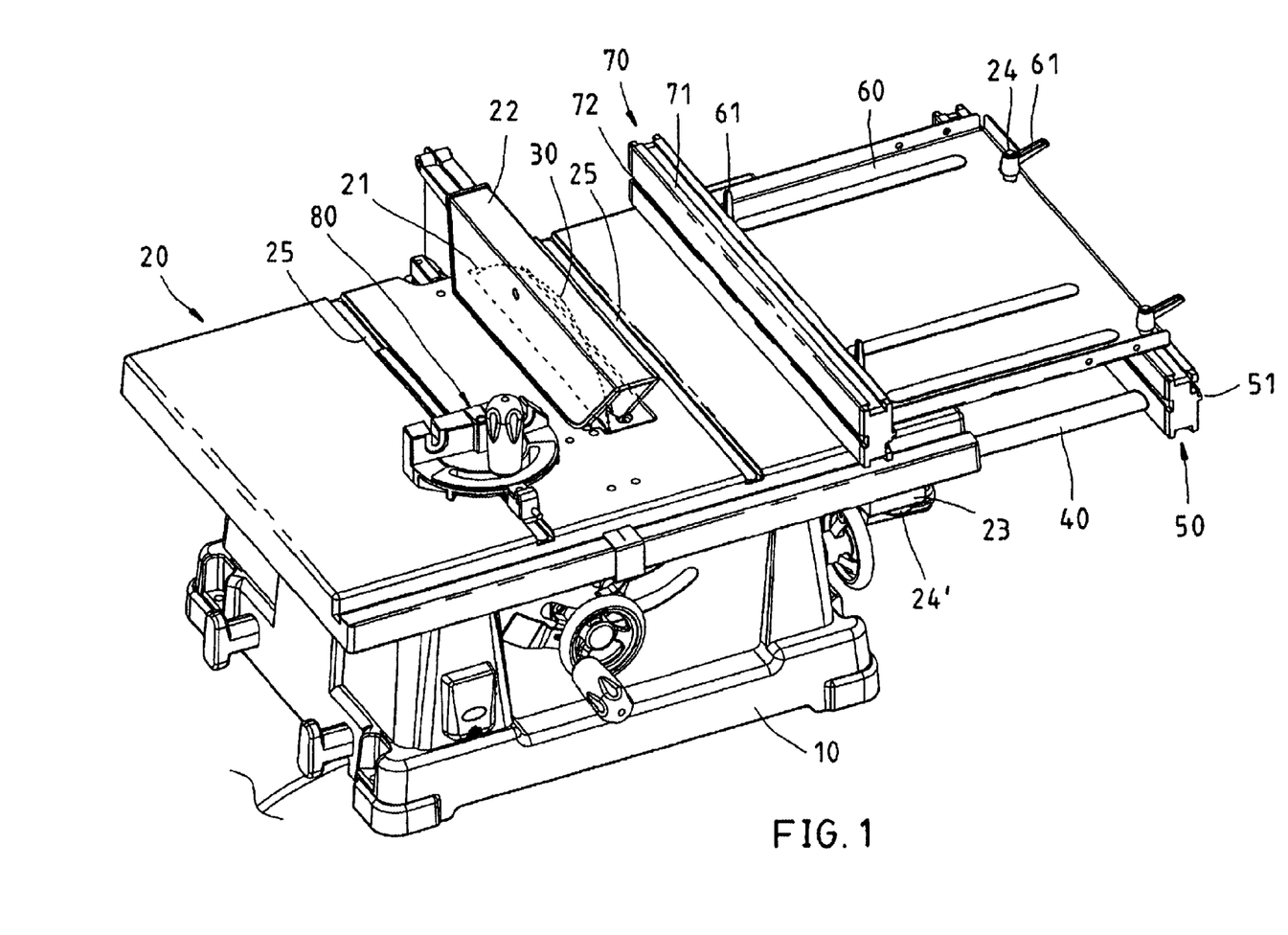
FIG. 1 is a perspective view of a table saw according to a preferred embodiment of the present invention.
Figure 2:
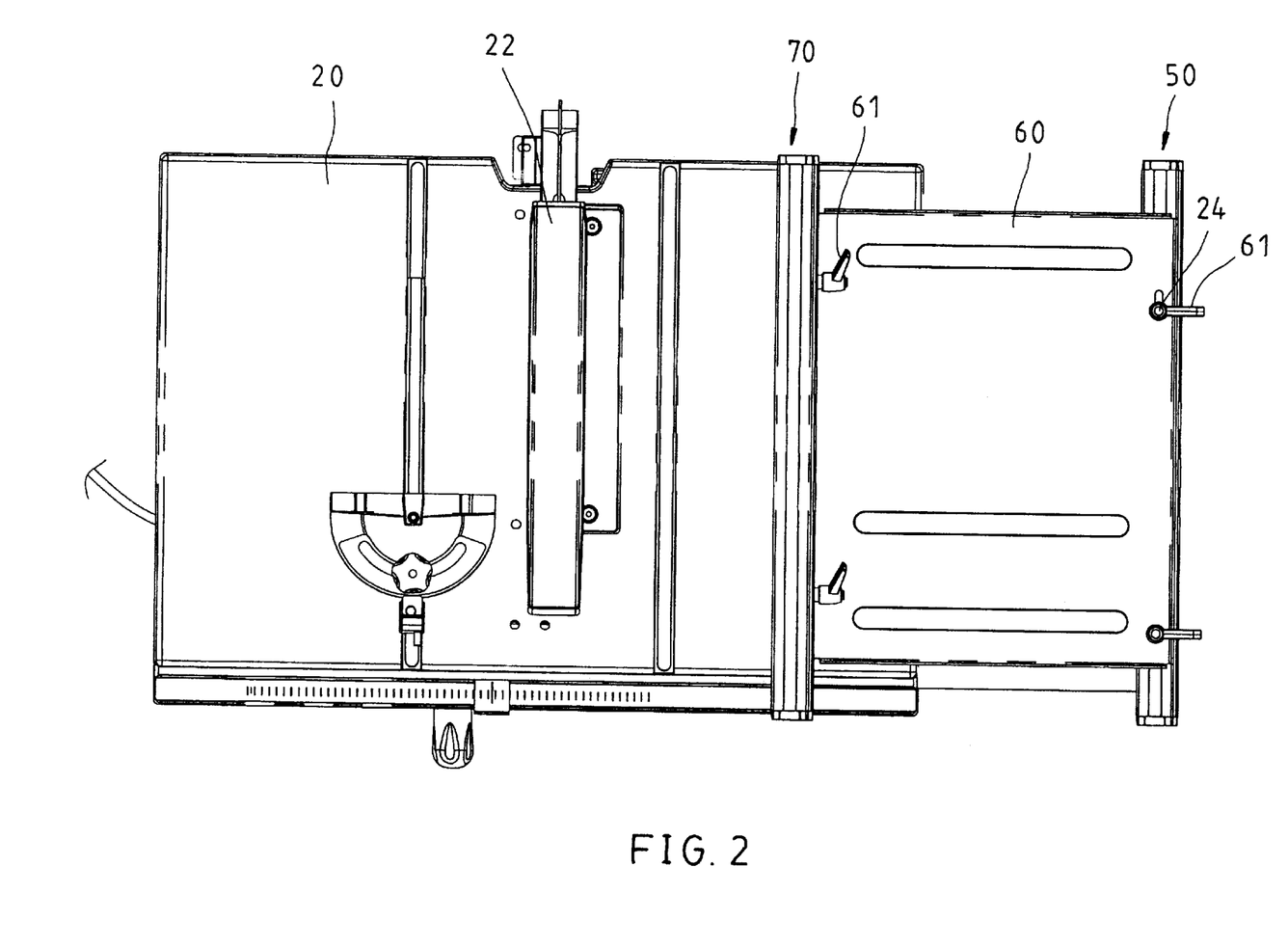
FIG. 2 is a top view of the table saw according to the preferred embodiment of the present invention.
Figure 3:
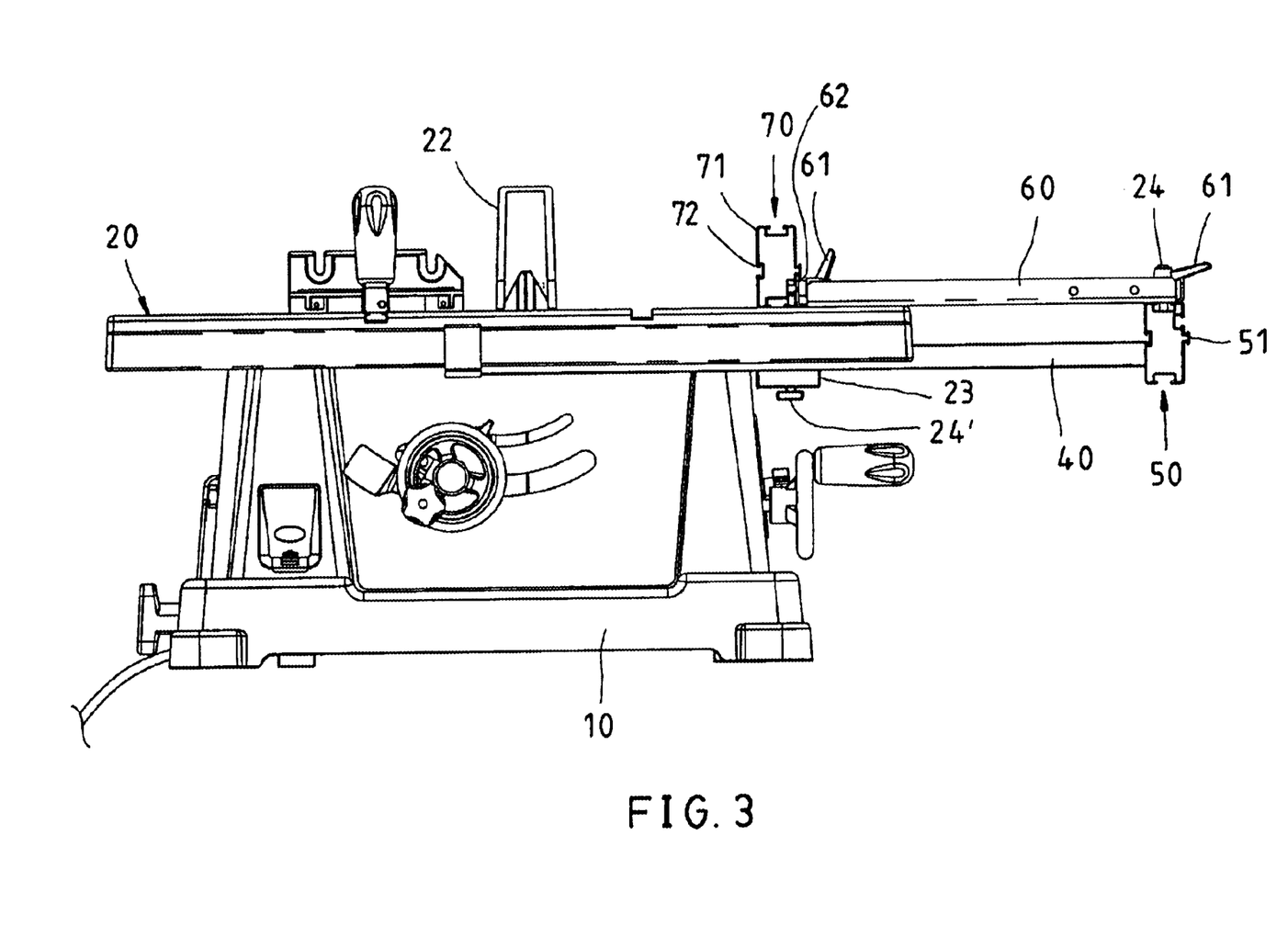
FIG. 3 is a front view of the table saw according to the preferred embodiment of the present invention.

Referring to FIGS. from 1 through 3, the flat bottom side of the rib fence 70 is slightly disposed in contact with the top surface of the worktable 20. When pulling or pushing the transverse bar 50 relative to the worktable 20, the sliding rods 40 are moved in and out of one short side of the worktable 20, and the rib fence 70 is moved with the connecting member 60 and the transverse bar 50, and therefore the pitch between the circular saw blade 30 and the rib fence 70 is adjusted subject to the size of the workpiece to be cut.

Figure 4:
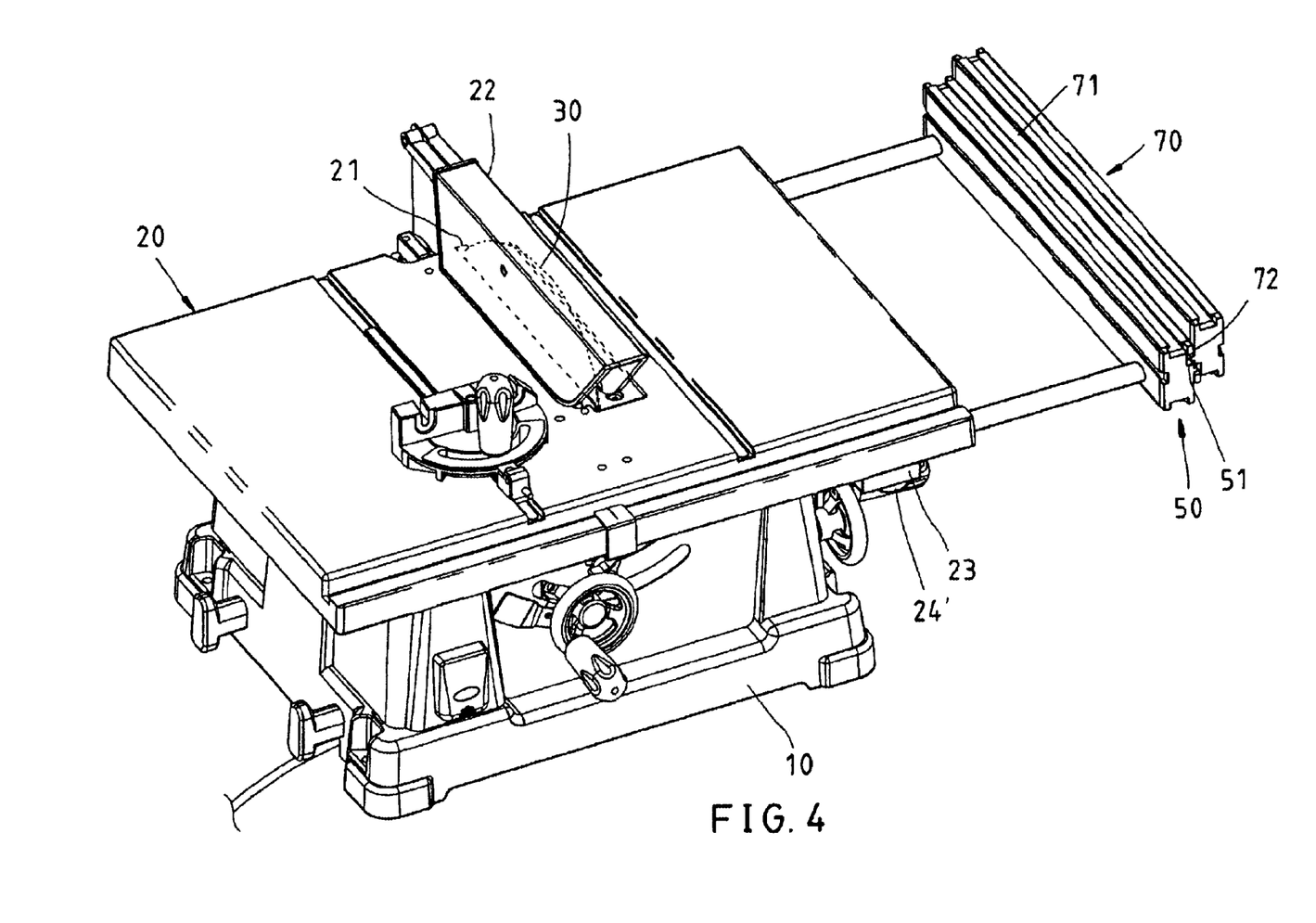
FIG. 4 is another perspective view of the present invention showing the connecting member removed from the table saw, the rib fence coupled to the transverse bar.
Figure 5:
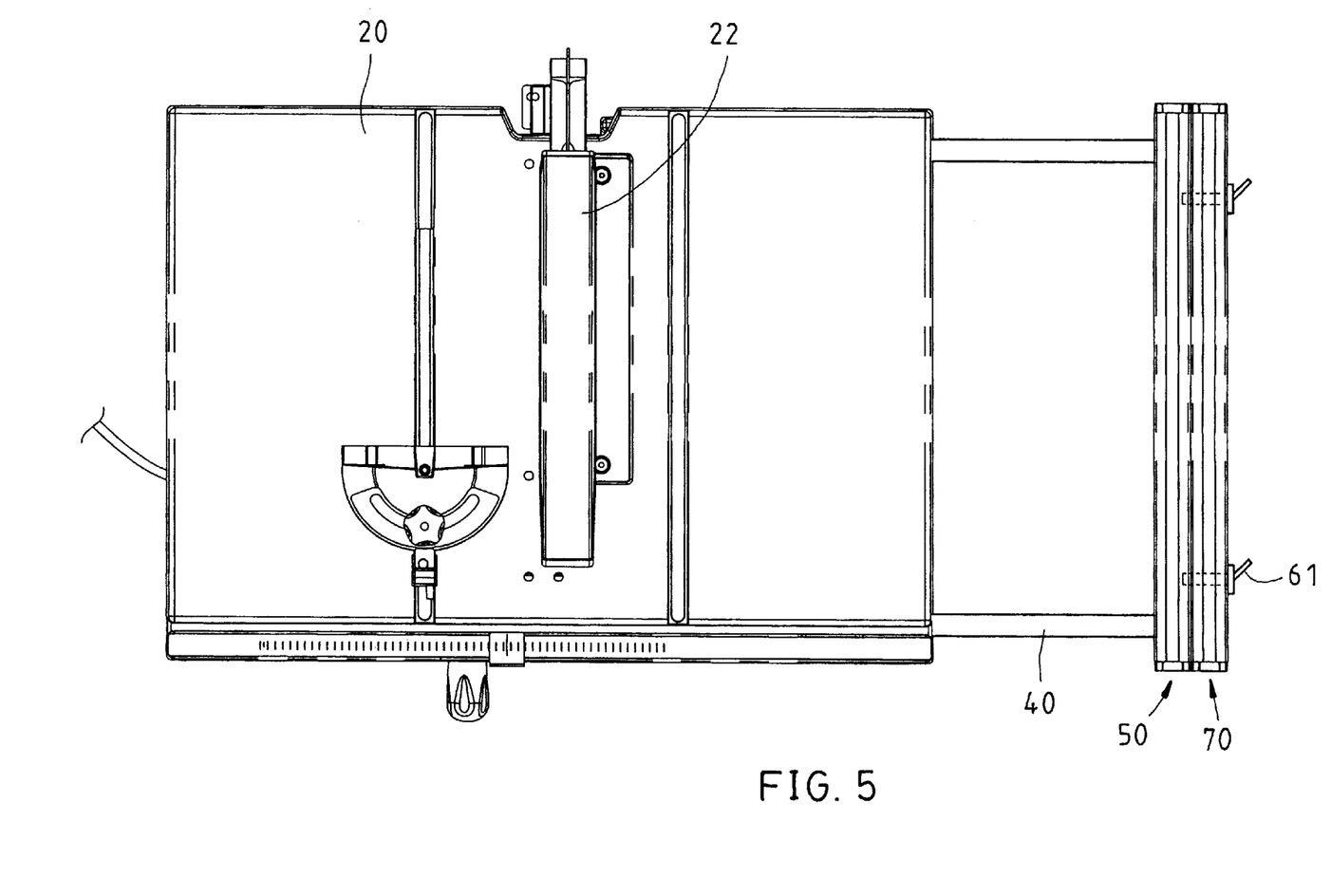
FIG. 5 is a top view of FIG. 4.
Figure 6:
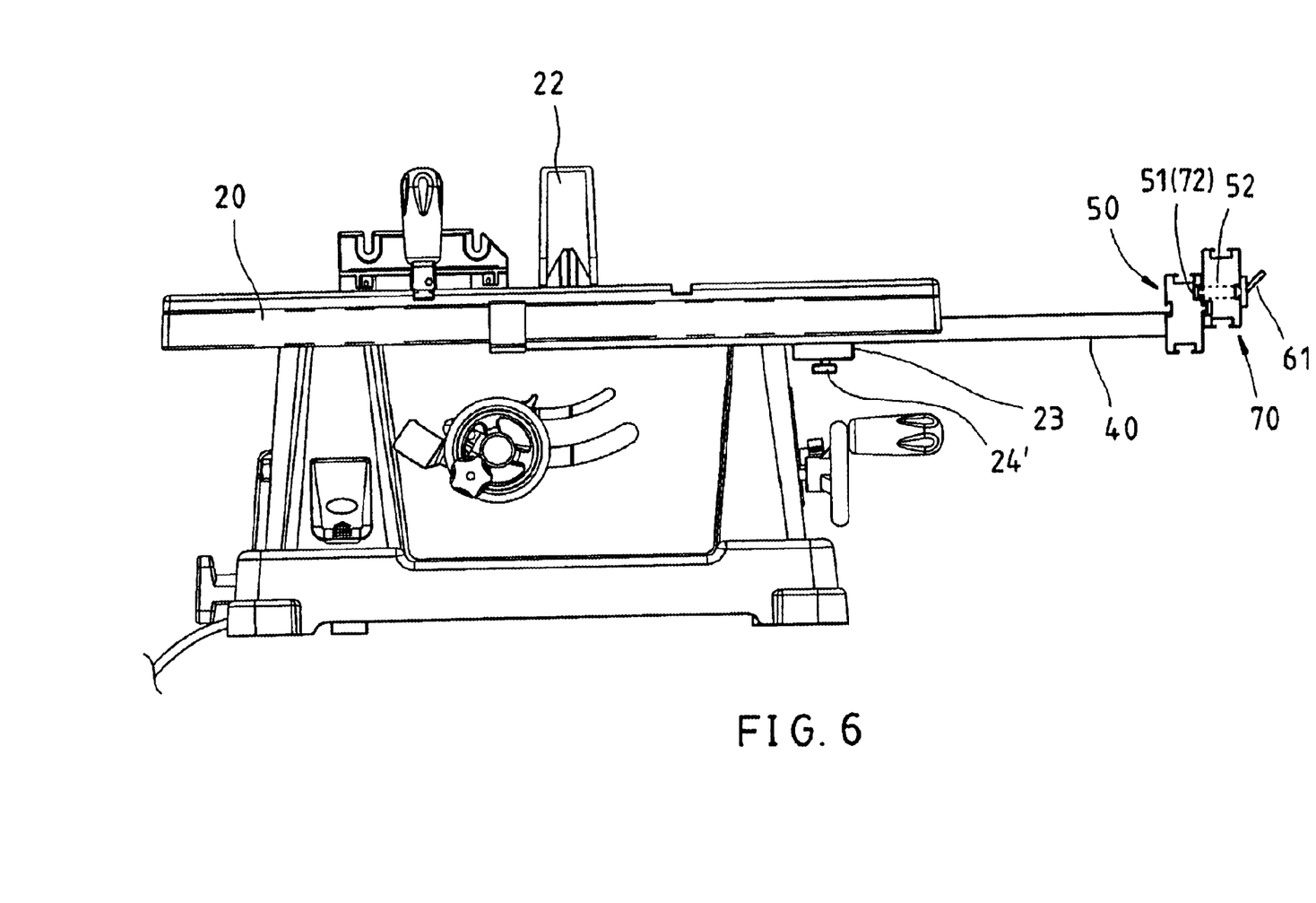
FIG. 6 is a front view of FIG. 4.

Referring to FIGS. from 4 through 6, when cutting a long workpiece, the connecting member 60 is disconnected from the transverse 50 and the rib fence 70, and then the coupling groove 72 is coupled to the longitudinal rib 51 for enabling the rib fence 70 to be slidably secured to the transverse bar 50. After the rib fence 70 had been secured to the transverse bar 50 with its two distal ends kept in flush with the ends of the transverse bar 50 as shown in FIG. 4, the workpiece is put on the top surface of the worktable 20 and the top sidewall of the transverse bar 50 and stopped with its one side against the stop face 71 of the rib fence 70 for cutting. After coupling of the rib fence 70 to the transverse bar 50, the locking lever 61 of each of the two quick-release locks thereof is respectively turned to the locking position and engaged into a respective through hole 73 of the rib fence 70 and a respective screw hole 52 of the transverse bar 50 to lock the rib fence 70, preventing displacement of the rib fence 70 on the transverse bar 50.

A scale provided at one long side of the worktable 20 measures the extending distance of the aforesaid transverse bar 50 from the worktable 20. Because this scale is of the known art, no further detailed description is necessary.

Figure 7:
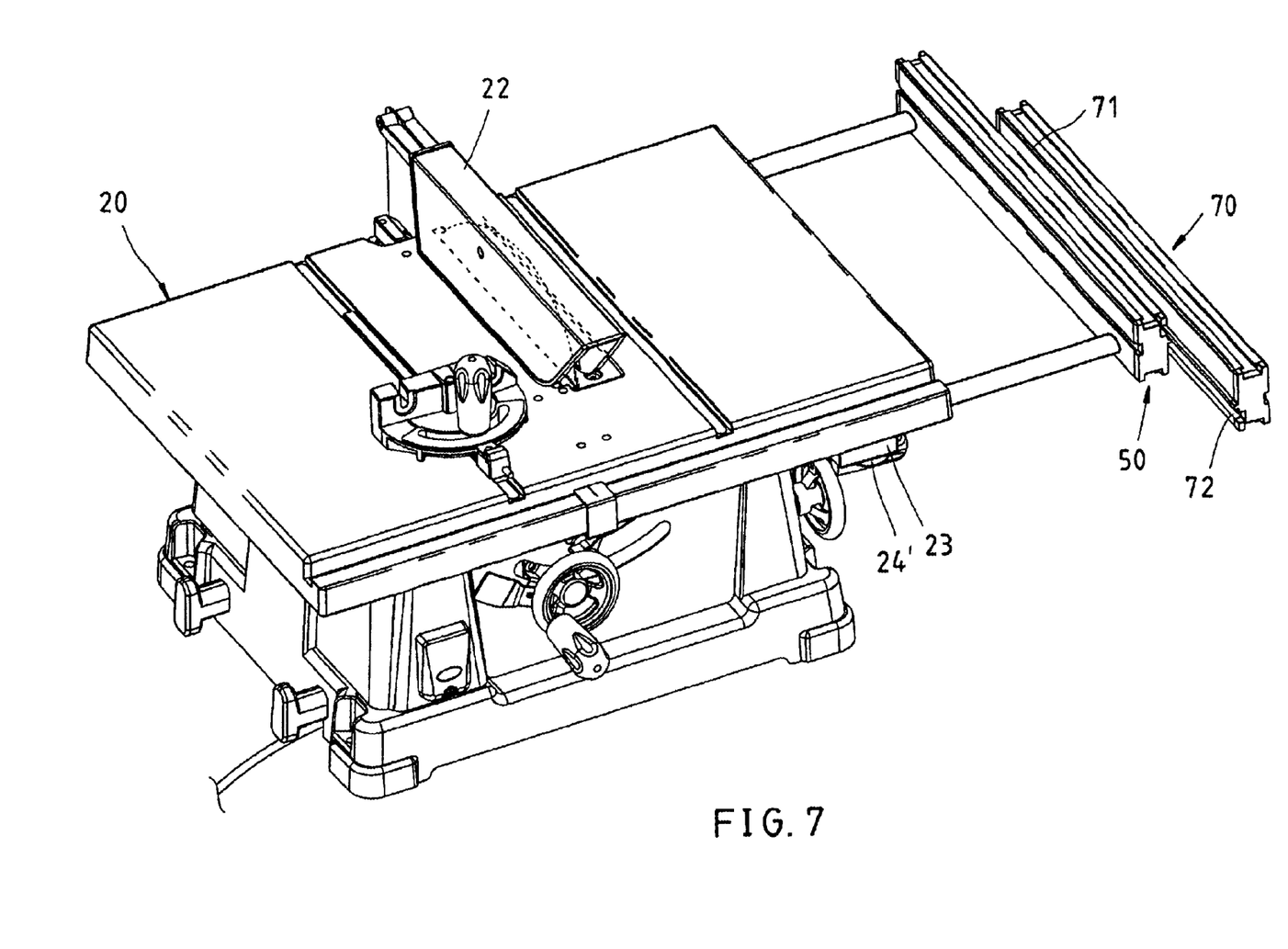
FIG. 7 is similar to FIG. 4 but showing the rib fence moved relative to the transverse bar and protruded over one long side of the worktable.
Figure 8:
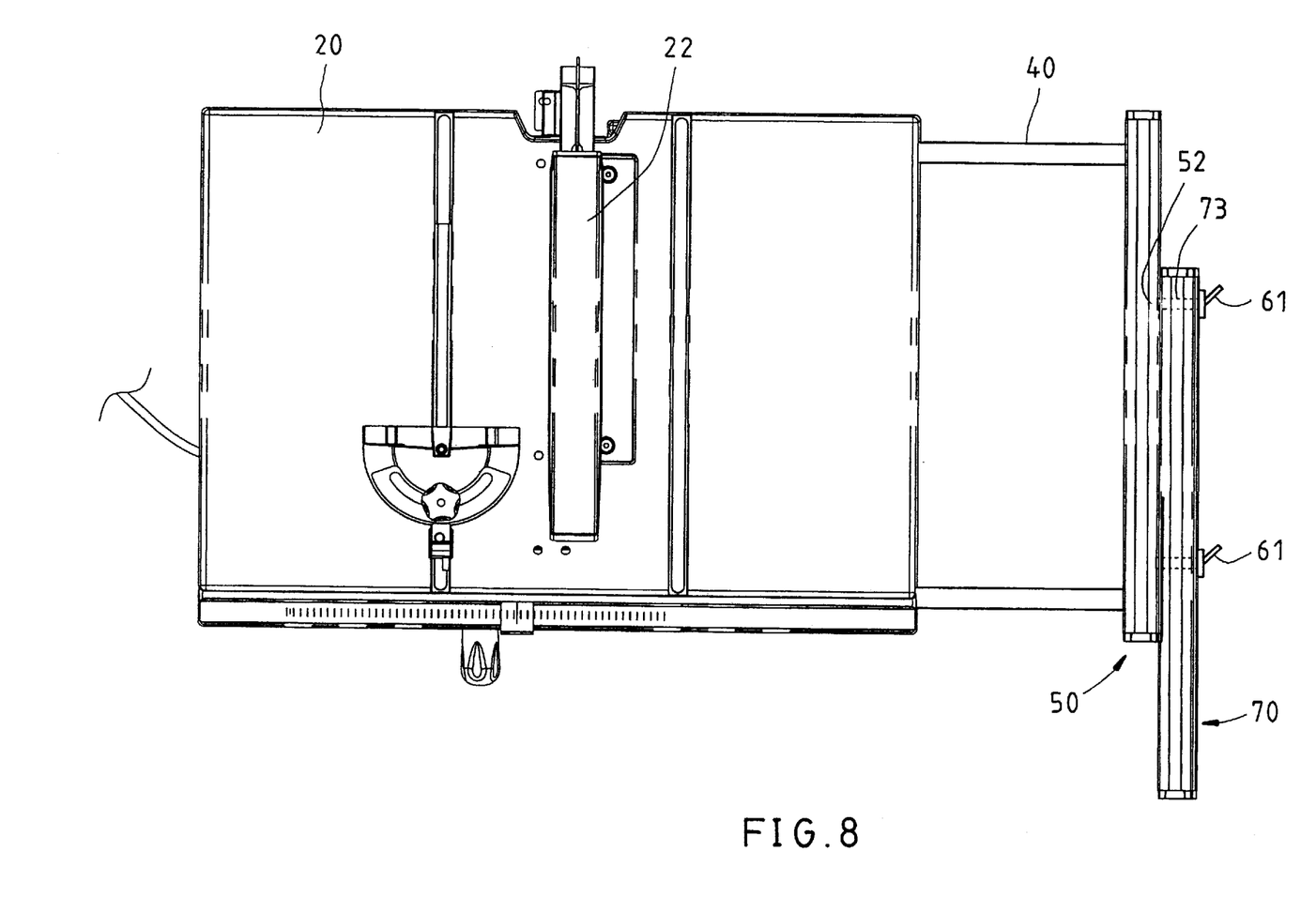
FIG. 8 is a top view of FIG. 7.

Referring to FIGS. 7 and 8, the rib fence 70 can be moved along the transverse bar 50 and protruded over one long side of the worktable 20 and then locked in the protruded position by the respective locking levers 61 to stop a plate-like workpiece or workpiece having a broad sidewall positively in the cutting position for cutting.

As indicated above, the position of the rib fence 70 can be adjusted in X-axis direction as well as in Y-axis direction subject to the dimensions of the workpiece to be cut.

Furthermore, the worktable 20 has two miter-gauge slots 25 disposed in parallel to the elongated slot 21 at two sides for the mounting of a miter gauge 80.

What is claimed is:

1. A table saw comprising:

a base;

a worktable fixedly supported on said base, said worktable having an elongated slot;

a circular saw blade pivoted in said base and partially projecting out of said slot;

a motor mounted inside said base and adapted to rotate said circular saw blade;

two sliding rods arranged in parallel at a bottom side of said worktable and moved in and out of one side of said worktable in direction perpendicular to said elongated slot;

a transverse bar fixedly fastened to said sliding rods at one end and disposed in parallel to said elongated slot, said transverse bar having a coupling portion;

a rib fence provided with a flat bottom sidewall, a stop face disposed at one lateral side thereof and adapted to stop a workpiece to be cut in position for cutting, and a coupling portion which is able to connect to the coupling portion of said transverse bar; and a connecting member having two opposite sides connected detachably and respectively to said rib fence and said transverse bar, thereby enabling said rib fence to be moved with said transverse bar and said sliding rods on said worktable when said connecting member is connected to said rib fence and said transverse bar, and said coupling portion of said rib fence being connected directly to said coupling portion of said transverse bar when said connecting member is detached from said rib fence and said transverse bar.

2. The table saw as claimed in claim 1 wherein the coupling portion of said transverse bar is a longitudinal rib extended along one long side thereof, and the coupling portion of said rib fence is a coupling groove longitudinally extended along one long side thereof fitting the longitudinal rib of said transverse bar for enabling said rib fence to be longitudinally slidably coupled to said transverse bar and extended out of one of two distal ends of said transverse bar.

3. The table saw as claimed in claim 2 wherein said transverse bar comprises at least one screw hole and at least one bolt respectively threaded into said at least one screw hole, and said rib fence comprises at least one through hole adapted to receive the at least one bolt of said transverse bar for enabling said rib fence to be secured to said transverse bar in position.

4. The table saw as claimed in claim 1 wherein said worktable comprises at least two support members adapted to support said sliding rods respectively and to guide movement of said sliding rods relative to said worktable, said two support members each comprising at least one screw hole and at least one holding down screw respectively threaded into the at least one screw hole of said support member and adapted to stop against said sliding rod.

5. The table saw as claimed in claim 1 wherein said rib fence comprises at least one screw hole disposed in one side thereof, and said connecting member comprises an upwardly protruded coupling portion disposed at one side thereof and at least one bolt mounted in said upwardly protruded coupling portion for threading into the at least one screw hole of said rib fence to secure said rib fence to said upwardly protruded coupling portion of said connecting member.

* * * * *